(12) United States Patent
Nestler et al.

(10) Patent No.: US 6,793,440 B2
(45) Date of Patent: Sep. 21, 2004

(54) NATURAL CUE SURFACE BYPASS COLLECTOR

(75) Inventors: John M. Nestler, Vicksburg, MS (US); Richard Andrew Goodwin, Vancouver, WA (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 39 days.

(21) Appl. No.: 10/045,381

(22) Filed: Jan. 15, 2002

(65) Prior Publication Data

US 2003/0131801 A1 Jul. 17, 2003

(51) Int. Cl.⁷ .............................. E02B 8/08; A01K 61/00
(52) U.S. Cl. .............................. 405/81; 405/80; 119/219
(58) Field of Search ............................ 405/80, 81, 82, 405/83; 119/219, 220

(56) References Cited

U.S. PATENT DOCUMENTS

| | | | |
|---|---|---|---|
| 3,338,056 A | 8/1967 | Roscoe | |
| 4,260,286 A | 4/1981 | Buchanan | |
| 4,437,431 A | * 3/1984 | Koch | ............ 405/83 |
| 4,481,904 A | 11/1984 | Fletcher | |
| 4,526,494 A | 7/1985 | Eicher | |
| 4,740,105 A | 4/1988 | Wollander | |
| 4,904,114 A | * 2/1990 | Warner et al. | ............ 405/82 |
| 4,929,122 A | 5/1990 | Yoas | |
| 4,932,007 A | 6/1990 | Suomala | |
| 5,161,913 A | 11/1992 | Boylan | |
| 5,263,833 A | 11/1993 | Robinson et al. | |
| 5,385,428 A | 1/1995 | Taft | |
| 5,433,554 A | 7/1995 | Minakami et al. | |
| 5,445,111 A | 8/1995 | Smith | |
| 5,558,462 A | 9/1996 | O'Haver | |
| 5,632,572 A | * 5/1997 | Chicha | ............ 405/81 |
| 5,660,499 A | 8/1997 | Bethune | |
| 6,038,494 A | 3/2000 | Fisher, Jr. | |
| 6,102,619 A | 8/2000 | Truebe | |
| 6,155,746 A | 12/2000 | Peters | |
| 6,160,759 A | 12/2000 | Nestler et al. | |
| 6,273,639 B1 | 8/2001 | Eikrem et al. | |
| 6,347,908 B1 | * 2/2002 | Safwat | ............ 405/81 |
| 6,357,389 B1 | * 3/2002 | March et al. | ............ 119/219 |
| 6,467,997 B2 | * 10/2002 | Johnson | ............ 405/81 |

* cited by examiner

Primary Examiner—Jong-Suk (James) Lee
Assistant Examiner—Lisa M. Saldano
(74) Attorney, Agent, or Firm—Earl H. Baugher, Jr.

(57) ABSTRACT

A system and method for guiding fish that migrate is provided. A preferred embodiment is affixed to a dam having intakes that: a) generate hydroelectric power and b) serve as a natural hydraulic cue for fish that, once attracted to the intake, may be injured or killed traversing the intake. A device resembling an oversize kitchen exhaust fan hood, with extension, is affixed adjacent the upstream side of a stream barrier that otherwise precludes fish from safely passing. The device simulates a naturally occurring hydraulic cue that fish use to migrate and may be used to defeat competing detrimental hydraulic cues. Also provided are embodiments to enable adjustment of the device to meet changing hydraulic conditions; to preclude the accidental provision of competing negative cues or stimuli; and to complement the simulated natural hydraulic cue provided by the device through using stimuli such as light, sound or combinations thereof.

14 Claims, 7 Drawing Sheets

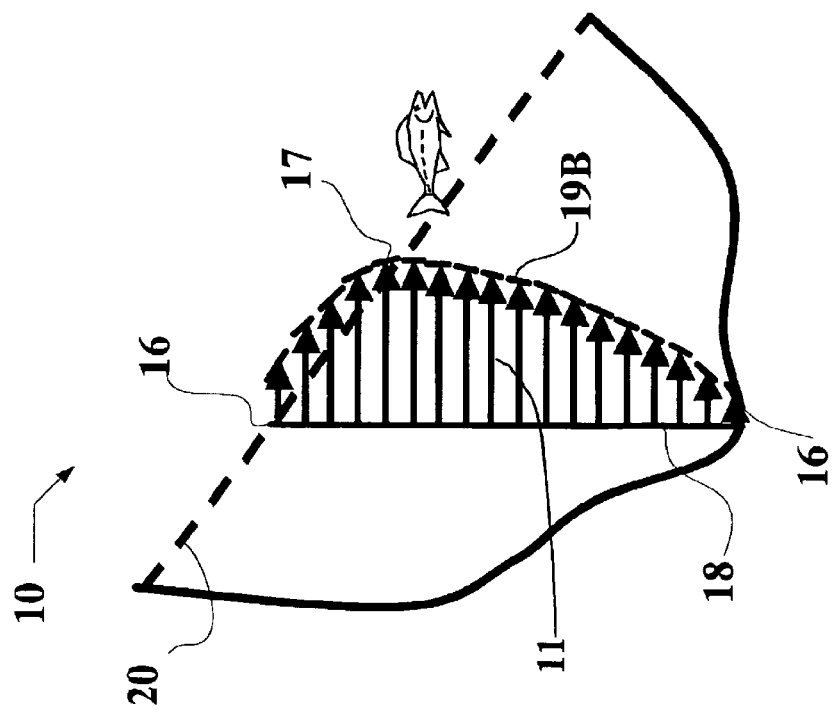
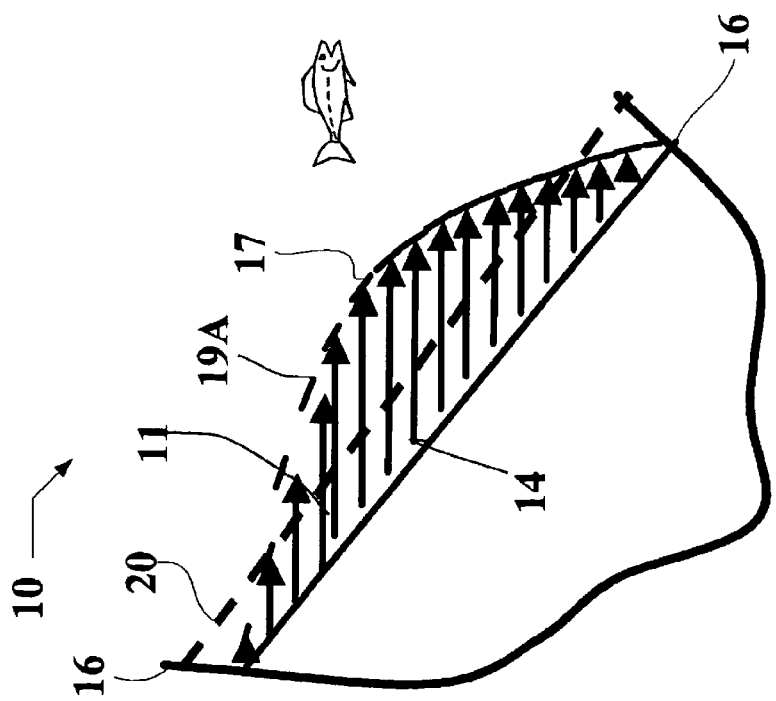

NATURAL CUE SURFACE BYPASS COLLECTOR

STATEMENT OF GOVERNMENT INTEREST

Under paragraph 1(a) of Executive Order 10096, the conditions under which this invention was made entitle the Government of the United States, as represented by the Secretary of the Army, to the entire right, title and interest in any patent granted thereon by the United States. This and related patents are available for licensing. Please contact Bea Shahin at 217 373-7234 or Phillip Stewart at 601 634-4113.

FIELD OF THE INVENTION

The field is that hydraulic engineering needed to guide, regulate, and modify fluid flow. In particular, a preferred embodiment of the present invention assists fish in circumventing an obstruction in a stream.

BACKGROUND

Water resources development typically includes the construction of dams across rivers to impound and regulate flows for power production, flood control, water supply, irrigation and other economically beneficial uses of water. In many rivers, adult fish typically migrate upstream through the river to spawn and rear in upstream areas. Once young, or juvenile, fish reach a certain size they instinctively migrate downstream to the adult habitat areas in downstream reaches of the river, in lakes, or in the ocean where they mature into adults and complete their life cycle. Juvenile salmon and many other juvenile fishes are spawned in upstream fresh water systems where the early life stages are completed but reach adulthood in downstream areas.

Unfortunately, dams block the migration of fish and thereby interfere with the completion of their natural life cycles. Sustainable water resources development is often facilitated by the use of hydraulic structures to pass these juvenile fish around the dam and other channel obstructions.

Systems and methods for assisting fish in circumventing man-made barriers in streams have been used for many years, e.g., U.S. Pat. No. 3,338,056, Fingerling Saving System, issued to Roscoe, Aug. 29, 1967, details a complex arrangement of recesses using vertically oriented entrances for permitting the transport of fingerlings around a dam. Quoting from the '056 patent: "The difficulty (of getting fingerlings downstream) arises due to the tendency of the fingerlings to follow flowing currents of water, and ordinarily such flowing currents go through the turbines of the associated power station. The fingerlings suffer high mortality in passing through the turbines . . . "

A later patent, U.S. Pat. No. 4,437,431, Method and Apparatus of Diversion of Downstream Migrating Anadromous Fish, issued to Koch, Mar. 20, 1984, uses an "artificial stream" generated by water jets within the natural stream together with long tubes having funnel-shaped entrances located on the sides of the stream at some distance from the upstream side of the dam. Another solution that offers an "attracting" artificial current based on an active source includes a propeller generated current as described in U.S. Pat. No. 6,102,619, Flow Inducer Fish Guide and Method of Using Same, issued to Truebe et al., Aug. 15, 2000. A related technique involving a series of opening and closing valves, fish passing actuators and conduits is detailed in U.S. Pat. No. 6,273,639 B1, Method and Apparatus for Facilitating Migration of Fish Past Dams and Other Barriers in Waterways, issued to Eikrem et al., Aug. 14, 2001.

To comply with government regulations, other solutions have involved configurations of barrier screens and bypass conduits such as that envisioned by U.S. Pat. No. 4,481,904, Fish Conservation Device, issued to Fletcher, Nov. 13, 1984; U.S. Pat. No. 4,526,494, Penstock Fish Diversion System, issued to Eicher, Jul. 2, 1985; and U.S. Pat. No. 4,740,105, issued to Wollander, Apr. 26, 1988. One such screen barrier uses a number of like modules in a ladder arrangement affixed to the bottom of the channel as described in U.S. Pat. No. 4,929,122, Fish Protection System for Dams, issued to Yoas, May 29, 1990. An underwater "screen house" located adjacent a dam is described in U.S. Pat. No. 5,385,428, Water Intake Fish Diversion Apparatus, issued to Taft et al., Jan. 31, 1995. A buoyant screen that may be sunk and raised at appropriate fish migration times is described in U.S. Pat. No. 5,558,462, Flat Plate Fish Screen System, issued to O'Haver, Sep. 24, 1996.

Still other solutions provide for a buoyant arrangement of vertically oriented slats located some distance upstream from a barrier such as described in U.S. Pat. No. 5,263,833, Fish Guiding Assembly and Method Utilizing Same, issued to Robinson et al., Nov. 23, 1993. This arrangement, and others like it, consumes a considerable amount of the surface area immediately upstream from the dam.

Active solutions are also proposed as exemplified in U.S. Pat. No. 5,445,111, Electrified Fish Barriers, issued to Smith, Aug. 29, 1995, describing linear curtain arrays characterized by pulsed driving signals that may use varying voltages. Other active solutions include complex electronic detectors and control systems to alter the operation of a hydroelectric powerhouse in the presence of migrating fish as described in U.S. Pat. No. 6,038,494, Control System for Enhancing Fish Survivability in a Hydroelectric Power Generation Installation, issued to Fisher et al., Mar. 14, 2000.

Fish ladders have been used to help returning anadromous fish get to spawning beds and are also proposed to help the juveniles return to the sea as described in U.S. Pat. No. 6,155,746, Fish Ladder and Its Construction, issued to Peters, Dec. 5, 2000. This details a complex series of basins having vertical inflow and outflow slots for transporting fish around a barrier.

The above solutions involve a configuration that is either much more complex and costly than a preferred embodiment of the present invention, uses much more "geography" to effect the desired result, uses energy or large quantities of water to effect the desired result, or a combination of these undesirable factors.

Juvenile outmigrating fish instinctively seek passage through the dam when their downstream journey is blocked. For a detailed discussion, refer to U.S. Pat. No. 6,160,759, Method for Determining Probable Response of Aquatic Species to Selected Components of Water Flow Fields, issued to Nestler et al., Dec. 12, 2000, and incorporated herein by reference. In the Columbia River, conventional surface bypass collectors (SBC's) are a preferred passage design used at dams for passing outmigrating juvenile fish. A conventional SBC employs a water intake plume to attract fish to its entrance. Using conventional engineering concepts, the SBC's attract and concentrate fish for conveyance around the dam in a manner that helps prevent their entry into turbines or other high-energy hydraulic conditions where they can be injured or killed. An SBC uses an attracting intake plume of sufficient flow magnitude to overcome the attracting flow of competing inflows such as are present at hydroturbines, sluicegates or spillways. Once juvenile fish enter the SBC they are conveyed to a bypass channel where they continue the migration downstream of the dam. Design of the entrance hydraulic conditions used in conventional SBCs does not incorporate knowledge of the behavior of the juvenile fish in natural streams and rivers. As a consequence, the performance of conventional SBCs varies, with some working well and others not. Poor performance most commonly results from uncertainty about the flow conditions required to attract juvenile fish to the entrance of the SBC. A preferred embodiment of the present invention provides a method that employs natural hydraulic cues.

A need, therefore, exists for an optimum method of guiding migrating fish, in particular juvenile fish, to such bypass channels.

SUMMARY

A preferred embodiment of the present invention envisions a system simulating at least one natural hydraulic cue to which fish are responsive in water. Migrating fish that respond to the simulated hydraulic cue may circumvent barriers to their downstream migration, such as booms, weirs, dams, hydroelectric powerhouses, and sluice gates.

The simulated natural hydraulic cue elicits an instinctive response of fish to select a portion of a stream having the mean maximum downstream velocity vector, u, and minimum strain rate variables in the downstream direction with respect to at least the depth and the width of the stream, these two variables represented mathematically as $$\frac{\partial u}{\partial z} \text{ and } \frac{\partial u}{\partial y},$$

respectively. Ideally, these two variables approach zero.

A preferred embodiment of the present invention uses an oven hood surface bypass collector (OH-SBC), with a main portion having at least one slot opening at the bottom and an extension (with the extension adopting the same profile on the top of the OH-SBC as the main portion) that projects upstream from a barrier along which the OH-SBC is positioned. The extension eliminates at least one zone of dead water adjacent the upstream side of the barrier, being positioned facing upstream and the farthest part of the OH-SBC from the barrier. The top of the OH-SBC is generally parallel to the surface of the water, in which it operates and its depth is selected so that passage of fish of a pre-specified size is facilitated.

The basic unit of the OH-SBC, which may consist of multiple units or modules, is structured to circumscribe an internal sluiceway running parallel to the upstream side of the barrier under the wedge-shaped extension and a collection gallery that parallels the sluiceway immediately adjacent to the upstream side of the barrier, the collection gallery being circumscribed by the main portion of the OH-SBC.

Fish are attracted to the collector gallery by the simulated hydraulic cue maintained by the Natural Cue SBC (NC-SBC) system, and are moved around the barrier by de-watering the collector gallery. An articulating extension may be affixed to the lower part of the collection gallery to control the "angle of attack" of the water that flows under the collection gallery.

The NC-SBC system may employ a sensor, for alerting to changing hydraulic conditions, the sensor inputting to a control that permits adjustment of the NC-SBC configuration. For example, the NC-SBC may use adjustable connections for affixing the OH-SBC to the upstream side of the barrier.

The NC-SBC may consist of multiple OH-SBC modules that span the entire intake system of a large hydroelectric powerhouse, for example. Each of these modules may be associated with a de-watering screen. The dewatering screen removes water from the collection gallery within the OH-SBC and thereby sets up a slight flow of water through the bottom slot and into the OH-SBC module. Alternatively, water flow into the bottom slot and through the modules may be effected by a manifold such that the water from each module is maintained in a chamber associated with the individual module.

Each NC-SBC system is designed to operate at an optimum level with respect to the intake of the dam or hydroelectric power house at which it is installed, thus customized to overcome a natural hydraulic cue resultant from the operation of that dam or hydroelectric power house's intakes.

Other design options for a preferred embodiment of the present invention include the reduction of distracting visual cues. For example, to avoid distracting or "scaring" the fish the inside of the collector gallery may be painted a neutral color, such as battleship gray. Further, turbulence in the collection gallery may be minimized by providing a smooth surface on its interior surface. Additionally, coating that surface with a material having a low coefficient of friction minimizes turbulence within the collector gallery.

Other options for a preferred embodiment of the present invention include adding stimuli in the region of the collector gallery. This added stimuli may be natural light piped in from the surface, artificial light, sounds proven to be attractive to fish, and combinations thereof. An example of sounds that are attractive to fish is provided in U.S. Pat. No. 4,932,007, Fish Behavior Control System, issued to Suomala, Jun. 5, 1990, and incorporated herein by reference.

Also provided as a preferred embodiment of the present invention is a method for facilitating the migration of fish downstream around a barrier. The method establishes a path in the water near the barrier. The path incorporates the simulation of at least one natural hydraulic cue used by migrating fish, so that they select the path over competing cues and are led to a safe route around the barrier. The simulated natural hydraulic cue capitalizes on an instinctive response of fish to select a portion of a simple, straight stream having a near maximum downstream velocity vector, u, and to minimize at least two strain rate variables in the downstream direction with respect to the depth and the width of the stream, the variables represented mathematically as $$\frac{\partial u}{\partial z} \text{ and } \frac{\partial u}{\partial y},$$

respectively. Ideally, both variables approach zero at the point in the profiles having minimum solid boundary effects, which is also the point in the cross section having maximum average downstream water velocity. Minimizing other strain rate variables may be an alternative solution of a preferred embodiment. These other strain rate variables include $$\frac{\partial u}{\partial x}, \frac{\partial v}{\partial x}, \frac{\partial v}{\partial y}, \frac{\partial v}{\partial z}, \frac{\partial w}{\partial x}, \frac{\partial w}{\partial y} \text{ and } \frac{\partial w}{\partial z}$$

and become important in stream channels that are complex (i.e., that are not approximately u-shaped in cross section) or curved. The method provides for installation of an appropriate number of OH-SBC modules upstream from and adjacent to the barrier, the OH-SBC module's length oriented parallel to the upstream side of the barrier and its top generally parallel to the surface of the water. The OH-SBC can be any of a number of alternative configurations as described above.

Finally, a barrier can be designed to incorporate the NC-SBC, either as an integral part of an original system or as a modification thereto. These barriers may be any of a number of types commonly used in streams and waterways such as a dam, a hydroelectric powerhouse, a weir, a boom, a sluice gate, a spillway, a berm, and combinations thereof.

A preferred embodiment of the present invention capitalizes on the propensity of outmigrating fish to follow stream lines that minimize turbulence and strain rate in the approach flow field. The design slightly modifies a flow entering into an obstruction in the stream, such as the turbines of a powerhouse, to create a hydraulic gradient in the strain rate hydraulic variables. This gradient is used to guide fish to the entrance of the SBC in a manner that evokes a natural response of the fish.

A preferred embodiment of the present invention is cost effective compared to conventional SBCs because it does not require high flows to be diverted from the artificial barrier, such as a powerhouse, to create an attracting intake plume. Further, large trash racks are not needed since the slot opening only minimally intercepts the flow field. Extensive de-watering facilities, as used with conventional SBCs, are not required since much less water is conveyed into it. Thus, large structures requiring extensive engineering to convey large volumes of flow are not needed. Finally, the deep bottom slot is located in a shaded zone of reduced light intensity. This reduces the migratory fish's reliance on visual acuity to navigate, resulting in a system that works equally well in changing external lighting conditions.

Further, an alternative configuration may use one or more sensors to detect changing hydraulic conditions and alert to a need to modify physical connections or dimensions. Mechanical adjustments for adjusting to changing hydraulic conditions at the entrance to a preferred embodiment of the present invention also aid in optimizing the simulation of a natural hydraulic cue.

BRIEF DESCRIPTION OF THE DRAWINGS

FIG. 3A depicts velocity gradients in a direction parallel to the x-axis (the length) of the stream of FIG. 2 and in a single horizontal plane along the y-axis (the width) of the stream at one location along the x-axis.

FIG. 3B depicts velocity gradients in a direction parallel to the x-axis (the length) of the stream of FIG. 2 and in a single vertical plane through one point along the y-axis (the width) of the stream.

DETAILED DESCRIPTION

Figure 1:
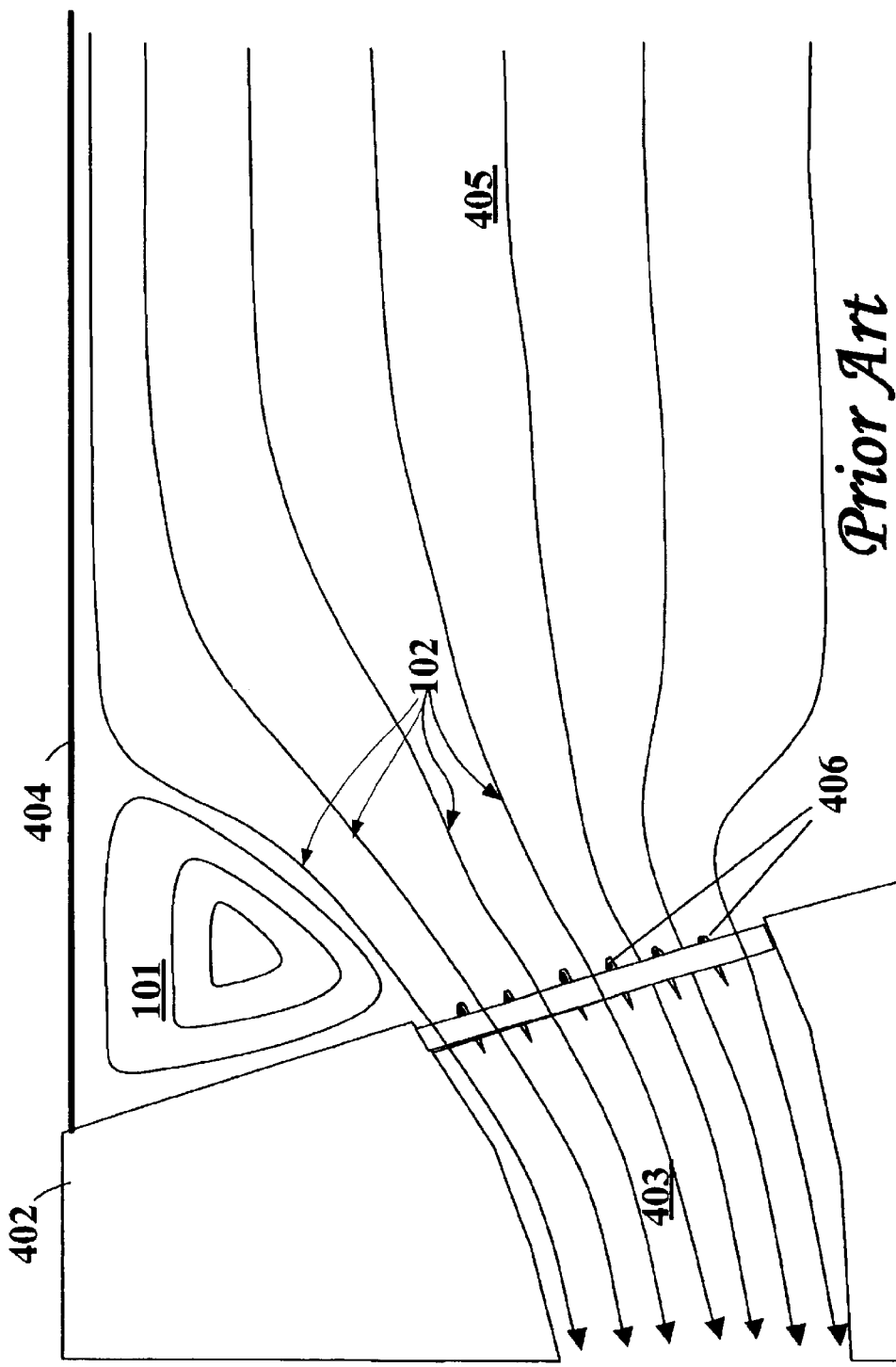
FIG. 1 shows a horizontal eddy generated by the action of an intake in a dam, as a side view of a body of water cut vertically along the direction of flow of a body of water backed up by the dam without a preferred embodiment of the present invention installed.

Refer to FIG. 1. Shown is a horizontal eddy 101 formed by the action of water streaming through an intake 403 of a dam 402 and located beneath the water surface 404 and above the turbine intake 403. Streamlines 405 depict the paths individual particles would take in the flow field as they either enter into the intake 403 or circulate in the eddy 101. Downstream water velocities increase substantially at the top and bottom of the intake 403 producing zones of high strain 102. Fish are known to avoid zones of high strain 102 indicated by changes in the direction or spacing of the stream lines. This configuration, if uncorrected, assures that some fish, in particular juvenile fish migrating downstream, as explained later, will be lost in seeking out a way around the dam 402 and thus be delayed or prevented from their downstream movement or enter the unforgiving intake 403 or be tossed against the trash rack 406. A preferred embodiment of the present invention insures that this can not happen.

Figure 2:
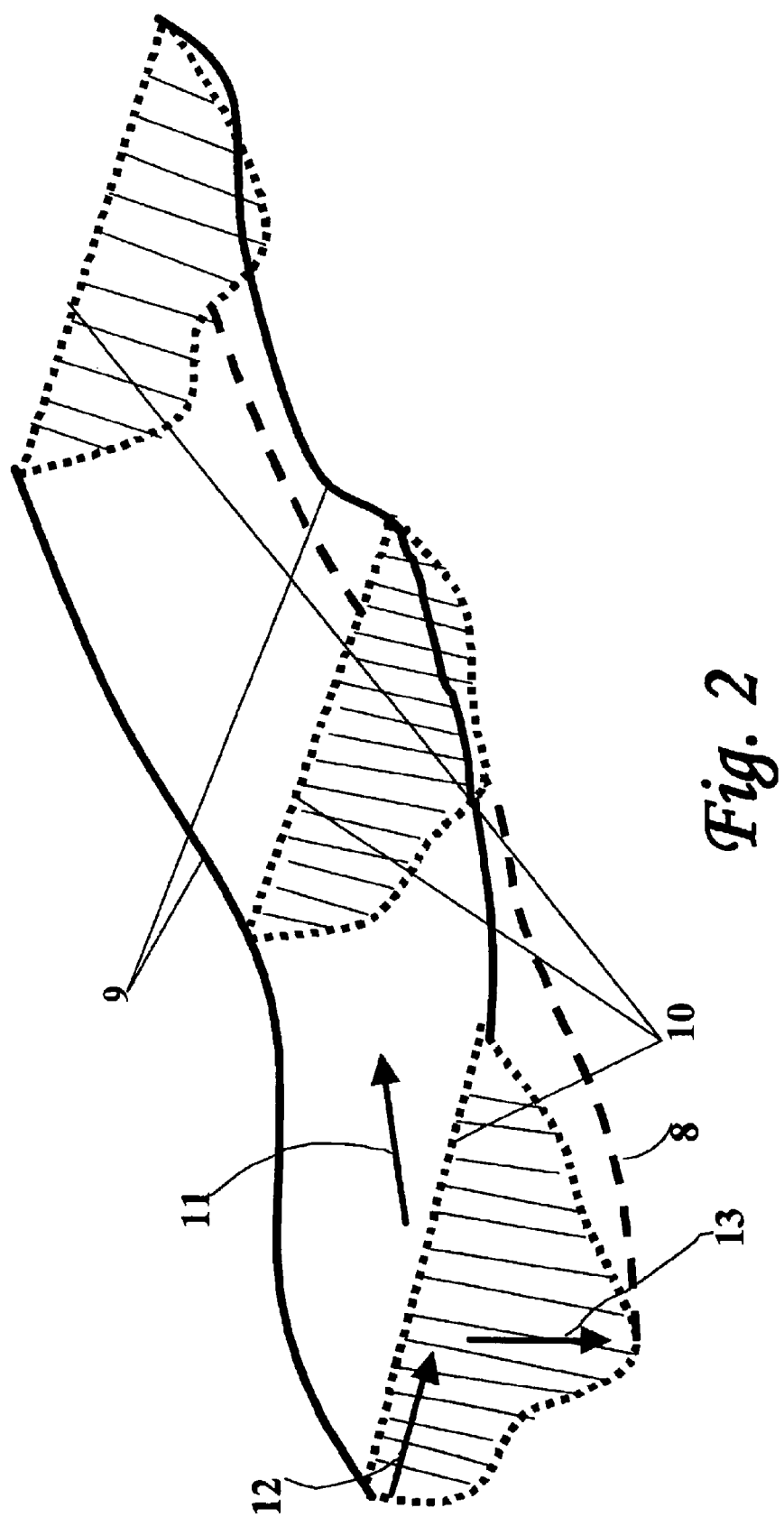
FIG. 2 is a perspective illustration of a body of water depicted as a stream, showing stream edges and elevation cross-sections at different parts of the stream for purposes of illustrating coordinates used in explaining the invention.

Refer to FIG. 2. Pictured is a line drawing of dimensions of a simple, straight stream channel with stream edges 9 and three cross-sections 10 established in standard three-dimensional coordinates, wherein: the x direction is parallel to the long axis of the stream channel 8, the y direction is perpendicular to the x direction and the z direction and extends the width of the stream, and the z-direction is perpendicular to both the x and y axes and represents depth (or elevation). Vectors u 11, v 12 and w 13 represent velocity of stream flow in the x, y and z directions, respectively.

Refer to FIGS. 2, 3A and 3B. A cross-section 10 with water surface elevation 20 shows multiple velocity vectors, u 11, in the x-y plane 14 at a constant z and multiple velocity vectors, u 11 in the x-z plane 18 at a constant y. In simple, straight natural channels 8, water velocities at physical boundaries 16 (e.g., where the water comes in contact with the stream bottom, boulders (not shown separately), or stream edges 9) are zero and increase away from the boundaries 16 to a maximum value 17 equidistant from the friction effects of the opposing boundaries 16 (after the effect of the boundary 16 has been corrected for differential roughness). The rate of change in velocity of "downstream" flow over distance, i.e., the strain rate, mathematically defined as the derivative of the u 11 vector, laterally $$\left(\frac{\partial u}{\partial y}\right)$$

or with depth $$\left(\frac{\partial u}{\partial z}\right)$$

has its greatest absolute values near the boundaries 16 and its smallest values at the "belly" 17 of the velocity profiles 19A, 19B shown by the curved dashed lines. In addition to the belly 17 being the zone of maximum mean water velocity, theoretically it is also the zone where the rate of change in down stream velocity with respect to either the z or y direction is zero. Mathematically this is expressed as:

$$\frac{\partial u}{\partial y} = \frac{\partial u}{\partial z} = 0 \quad (1)$$

Equation 1 embodies the mathematical description of the downstream migratory behavior of juvenile fish in simple, straight natural channels. That is, juvenile fish select swim paths that minimize the strain rates $$\left(\frac{\partial u}{\partial y}\right) \text{ and } \left(\frac{\partial u}{\partial z}\right),$$

once a certain strain value or threshold is met, by swimming in the direction of maximum velocity magnitude. This behavioral rule allows outmigrating fish to consistently locate themselves in the portion of the river having the highest average downstream water velocity. In this way, fish can minimize the time of their journey and minimize their expenditure of energy during their migration to the ocean. This zone is where fish concentrate so any artificial device would be optimized by location there or at an artificial device that creates a hydraulic environment that similarly minimizes the absolute value of the strain rates, $$\left(\frac{\partial u}{\partial y}\right) \text{ and } \left(\frac{\partial u}{\partial z}\right)$$

and provides a small velocity signature. This will attract fish because approaching fish would interpret the artificial environment as being their optimum pathway to the ocean.

Figure 4:
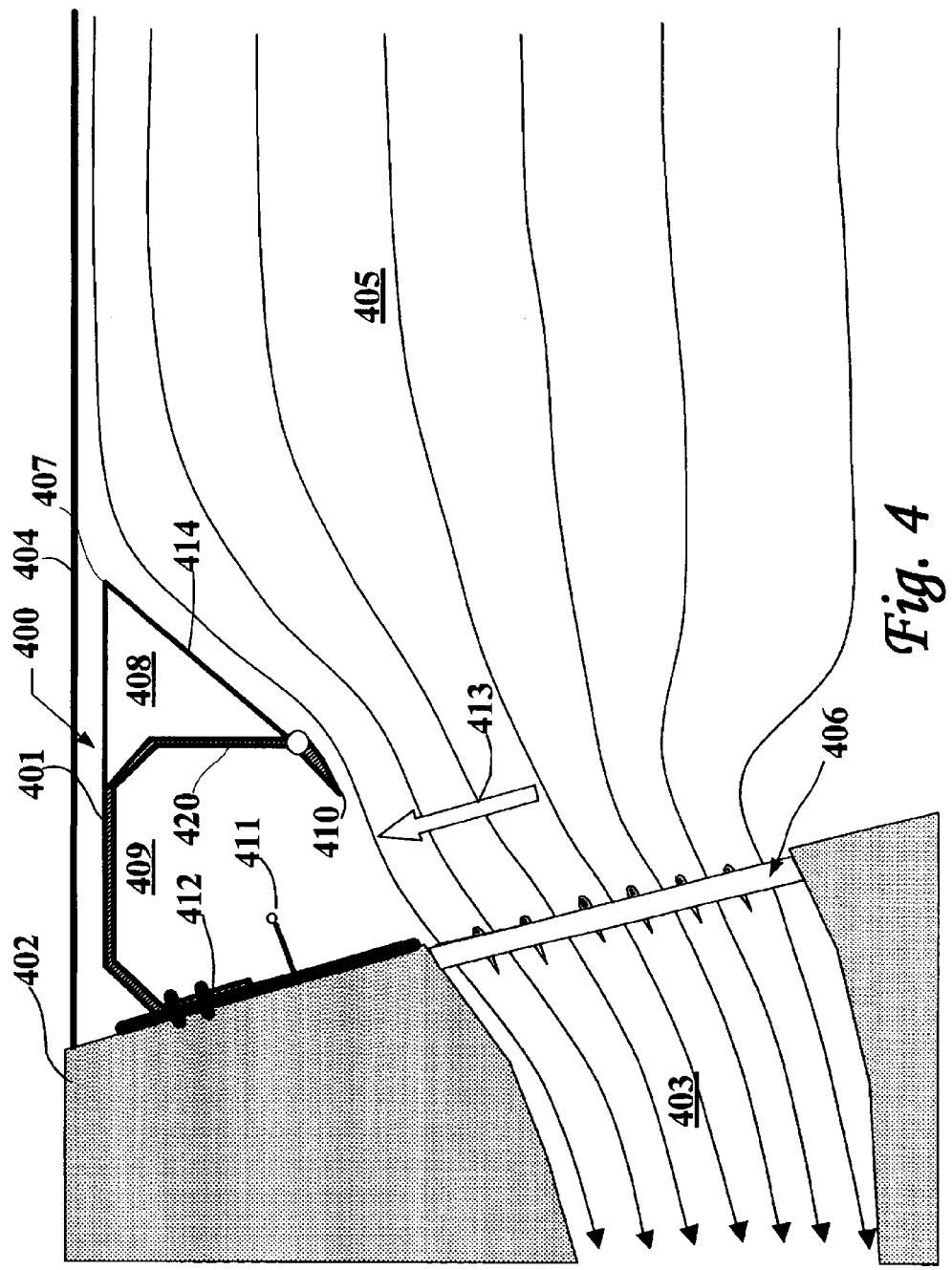
FIG. 4 illustrates the dam and body of water depicted in FIG. 1 with a preferred embodiment of the present invention installed, showing the change in the horizontal eddy induced thereby.

Refer to FIG. 4. Shown is a profile of a preferred embodiment of the present invention. i.e., a natural cue surface bypass collector (NC-SBC) 400, consisting of an "oven hood" surface bypass collector (OH-SBC) 401, attached to a dam 402 just above the turbine intake 403 with reference water surface 404. The shape of the OH-SBC 401 gives it its name; since when viewed from the front it closely resembles the oven hood used to exhaust cooking smells and smoke from a stove top. Streamlines 405 depict the paths individual particles would take in the flow field as they approach and enter the trash rack 406. The OH-SBC 401 has the following unique design features:

- an extension 407 projects upstream of the dam 402 to eliminate the horizontal eddy 101 commonly encountered above intakes;
- an internal space 408 defined by the outer extension 407, where the internal space may be an isolated chamber or part of a sluiceway;
- a collector gallery 409 that parallels the internal space 408 (as each space may be envisioned running into and out of the paper in FIG. 4) and is separated from it by a solid wall 420 (or the solid wall could be replaced by a de-watering screen);
- an articulating, adjustable extension 410 that partially controls the angle of attack of the water that flows under the collector gallery 409;
- a hydrodynamic sensor 411 that monitors water velocity and other hydraulic conditions that can be used to remotely adjust the articulating extension 410; and
- adjustable attachment points 412 at the face of the dam 402 that allow dam operators to raise or lower the OH-SBC 401 to optimize its efficiency as water levels fluctuate.

Figure 5:
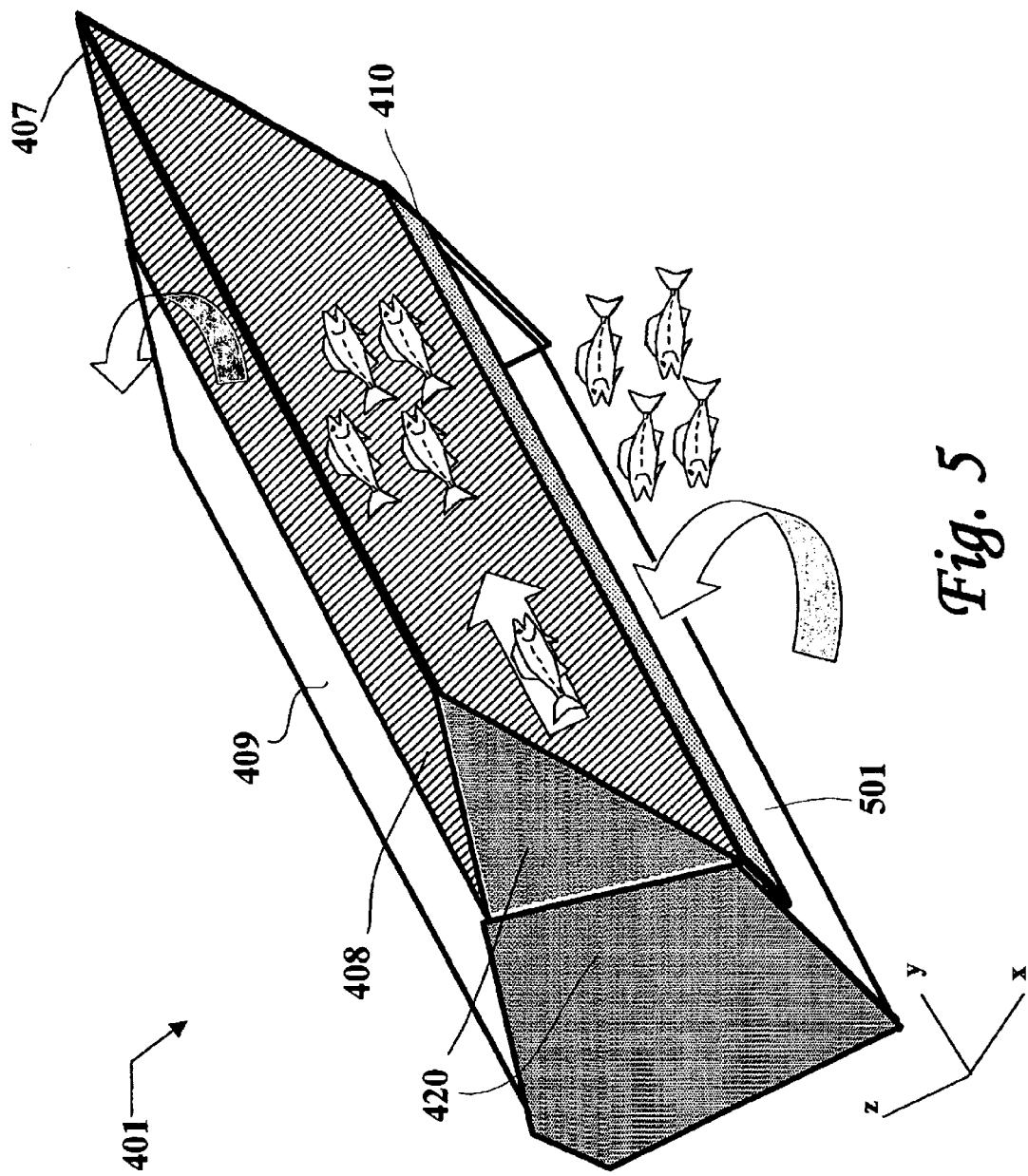
FIG. 5 shows salient features of a preferred embodiment of the collector of the present invention to include the direction fish enter.

Refer to FIGS. 4 and 5. The OH-SBC 401 causes the gradient represented by the absolute value of $$\frac{\partial u}{\partial z}$$

413 to decrease toward the slot opening 501 to the collector gallery 409. A fish's natural instinct will cause it to pursue this decrease in gradient and move towards the collector gallery 409 rather than to the turbine intake 403, particularly if a small attracting inflow is also provided at the slot opening 501.

Refer to FIG. 5. Shown is a three-quarters perspective view of one module of the OH-SBC 401 showing the slot opening 501 into the collector gallery 409 and the following design features: side wall to the collector gallery 420, extension 407 to the OH-SBC 401 and articulating extension 410. The OH-SBC 401 may be connected to an orifice in an ice and trash sluice gate (not separately shown) or to other conventional means of conveying fish around a dam 402.

Figure 6:
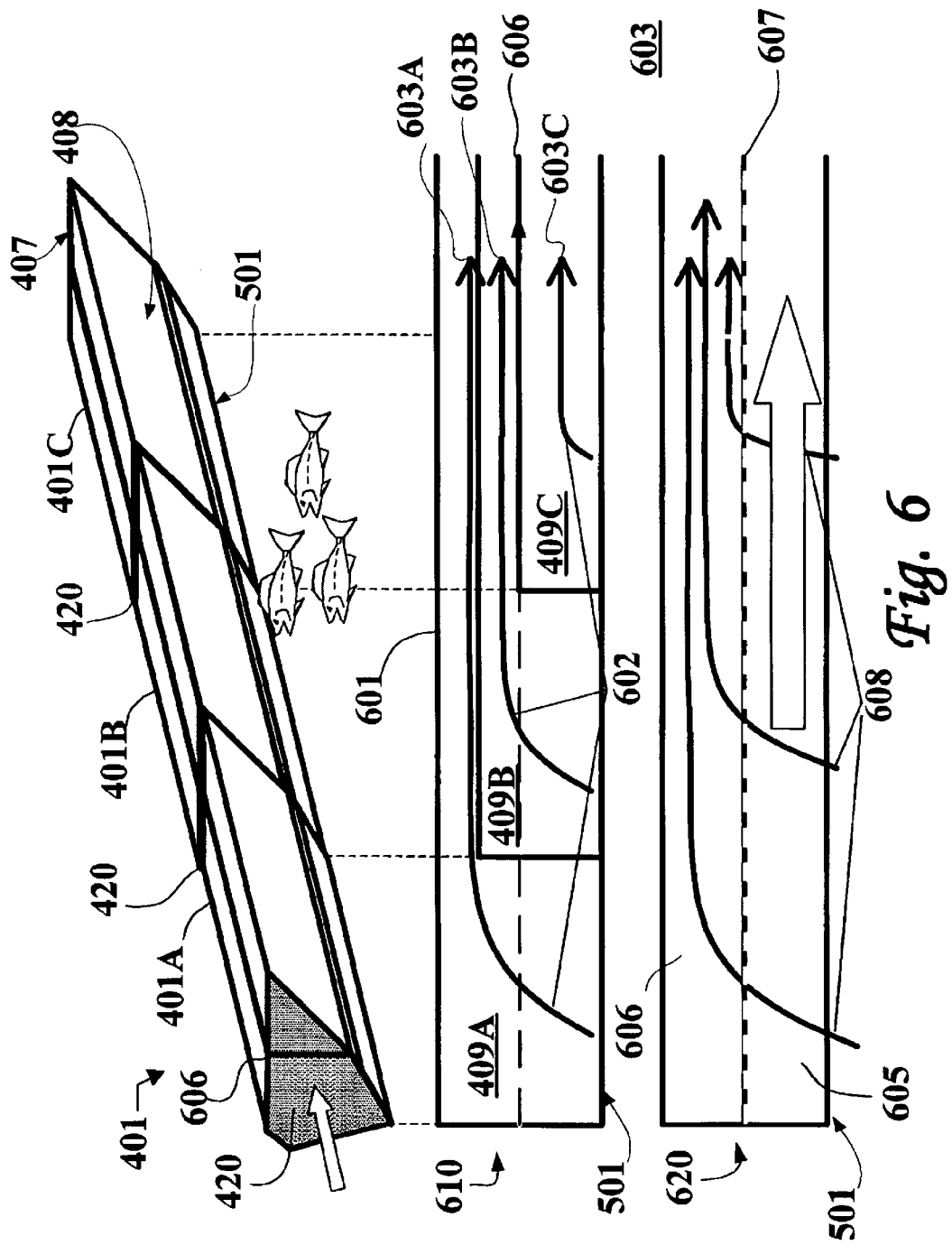
FIG. 6 shows the collector of FIG. 5 with two alternate means to transition, size and locate water and fish handling systems using either a common collector galleries or separate collector galleries for each installed unit of the invention.

Refer to FIGS. 4 and 6. Shown are both a three-quarters and two bottom view perspectives of a three-module OH-SBC 401A, 401B, 401C. The two bottom view perspectives describe the two options available for conveying water among the three modules 401A, 401B, 401C. The upper bottom view perspective 610 describes a manifold system 601 that can be employed in which the water entering each module 401A, 401B, 401C through the slot opening 501 is maintained in separate chambers 409A, 409B, and 409C until discharged into a separate bypass channels 603A, 603B, and 603C, respectively. The separate bypass channels 603A, 603B, 603C eventually merge into a combined bypass channel 603. The method of operation is illustrated by the separate paths made by three individual fish along oaths 602 moving through the manifold system 601. The internal space 408 in the extensions 407 exist as separate chambers and do not connect with the gallery 409. The internal space 408 in the extensions 407 may be filled with floatation to accept some of the weight load of the OH-SBC 401 from the dam 402. Standard engineering practice can be used to transition, size and locate the connections of the manifold 601 to its exit to the bypass channel 603k with the requirement that all structural elements and design features must either minimize or hold constant the absolute value of the strain rate variables in the x (downstream) direction, and provide a small net flow towards the bypass channel 603. The net flow towards the bypass channel 603 attracts outmigrating fish thereby preventing them from reversing their path and rejecting the OH-SBC 401. The manifold system 601 has the advantage that it is modular and can be relatively easily expanded since the de-watering system is separate for each module 401A, 401B, 401C. Alternatively, as shown in the bottom most figure 620, modules 401A. 401B. 401C can be connected so that they share a common collection gallery system 604 605 and a common extension gallery system 606 by removing the sidewalls 420 between each module 401A, 401B, 401C. The wall 606 separating the collection gallery system 604 from the extension gallery system 605 can be replaced by a single set or multiple sets of de-watering screens 607. The de-watering screens 607 allow the controlled passage of water (illustrated by the three stream lines 608) into the collection gallery system 605 from the dam forebay but prevent the entrance of fish into the extension gallery system 606. The water from the extension gallery system 606 can then be collected in a discharge pipe (not shown separately) and routed to a turbine (not shown separately) where it can be used to generate power or be passed around the dam 402. Fish concentrated in the collection gallery system 605 can be routed through to a bypass channel 603 to be bypassed around the dam 402. The advantage of the continuous system is that less water needs to be handled by the bypass channel 603. Standard engineering practice can be used to size and locate the de-watering screens 607 with design features that minimize or hold constant the absolute value of the strain rate variables in the x (downstream) direction.

Figure 7:
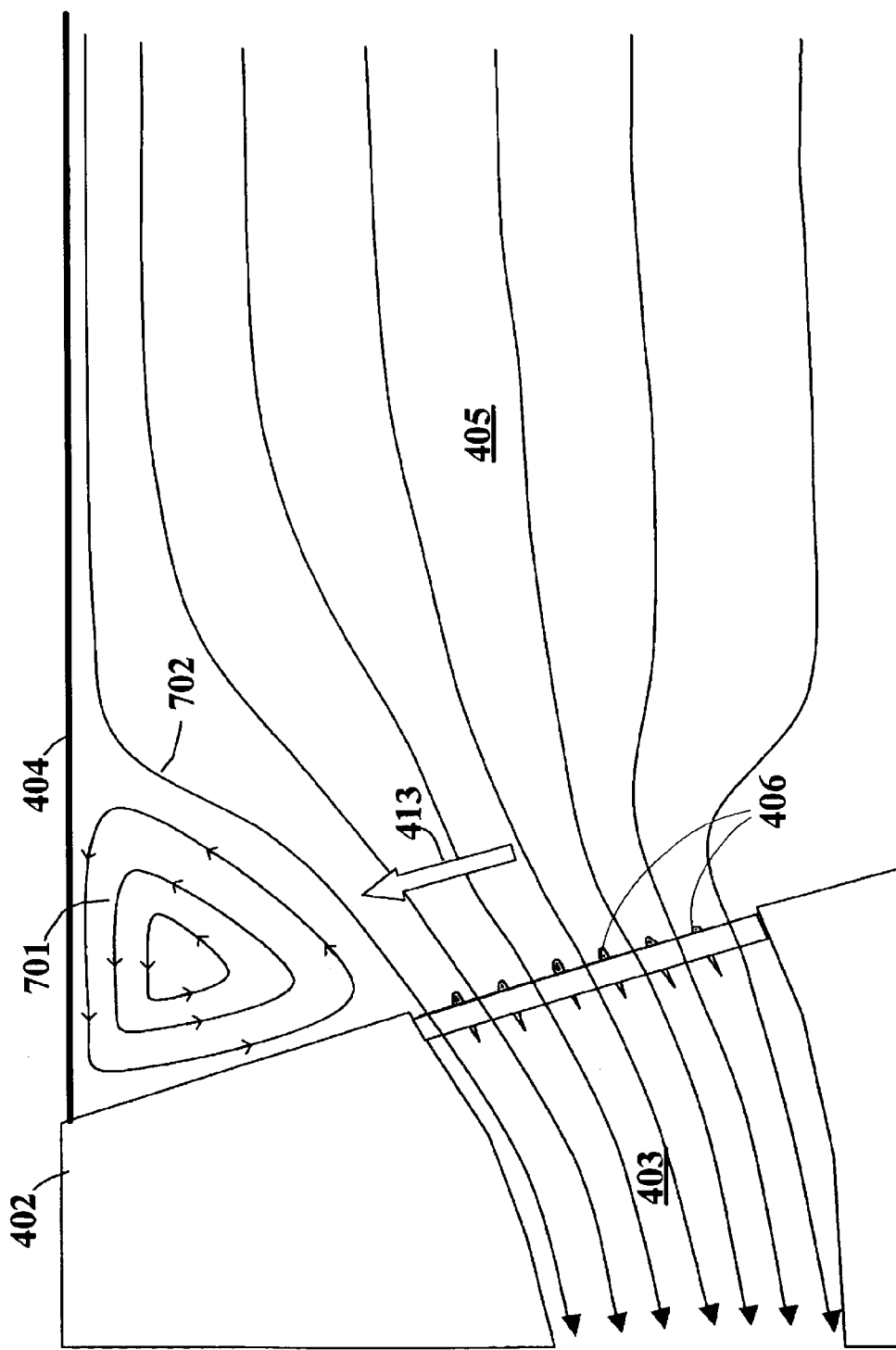
FIG. 7 depicts the body of water and dam of FIG. 1, for illustration purposes only omitting the invention as shown in FIG. 4, to illustrate the change from the vertical eddy of FIG. 1 without the present invention to a horizontal eddy or "roller" when incorporating a preferred embodiment of the present invention.

Refer to FIG. 7. Shown is a profile of a dam 402 at the intake 403 of a hydropower turbine showing the presence of a horizontal eddy, or roller 701 immediately above the intake 403 and between the dam 402 and the point 702 where the stream lines are directed towards the intake 403. The minimum absolute value of $$\frac{\partial u}{\partial z}$$

413 in the upper part of the hydropower intake plume represented by the stream lines 405 is least towards the center of the eddy 701 as indicated by the gradient $$\frac{\partial u}{\partial z}$$

413. Therefore, juvenile fish in the zone of the stream lines 405 will be attracted into the area formerly occupied by the eddy 701 (particularly if it is replaced by an attracting flow) where they will follow a path that is most like what occurs in a natural migration.

EXAMPLE

Outmigrating juvenile fish make use of hydraulic cues to navigate their way through the complex flow fields of natural streams and rivers, particularly in muddy water or at night when visual acuity is impaired. Refer to FIG. 2. The natural flow fields of simple (approximately u-shaped in cross section), straight stream channels 8 are described mathematically as velocity vectors u 11 in the direction of stream flow in its channel 8 (x-direction) either across the stream from streamside 9 to streamside 9 (y-direction) or in the direction of the depth of the stream (z-direction). The most important direction for purposes of fish migration in simple channels 8 is the x direction, the velocity represented by the u vector 11. The acceleration terms, $a_u$, $a_v$, and $a_w$, represented mathematically as the derivative of the velocity terms, provide the acceleration in the direction of the u 11, v 12 and w 13 velocity vectors, respectively, and may also play a role. In natural channels u 11 at solid boundaries, such as the sides 9 and bottom of the channel 8, has a theoretical zero value because of friction and increases at a high rate of change away from the solid boundaries (i.e., where the water comes in contact with the stream sides 9 and stream bottom) to a maximum average water velocity approximately equidistant from the friction effects of the solid boundaries (after the effects of the various boundaries have been corrected for differential roughness). As the water velocity approaches maximum, the rate of change in velocity approaches zero. This zone of maximum average water velocity is important to migrating fish because it represents, on average, the greatest velocity in the cross section and the swim pathway to the ocean that requires the least expenditure of energy by actively migrating fish. In addition to minimizing resistance, this zone maximizes the size of the sensory envelope within which fish are able to detect and avoid predators, and maximizes their ability to detect and orient to hydraulic cues. Fish use this zone as the optimum pathway through complex river channels 8.

Refer to FIGS. 3A and 3B. The rate of change in velocity vectors is embodied in the hydraulic strain rate or tensor variables, $$\frac{\partial u}{\partial x}, \frac{\partial u}{\partial y}, \frac{\partial u}{\partial z}, \frac{\partial v}{\partial x}, \frac{\partial v}{\partial y}, \frac{\partial v}{\partial z}, \frac{\partial w}{\partial x}, \frac{\partial w}{\partial y}, \text{ and } \frac{\partial w}{\partial z}.$$

For example, the rate components of u 11 with respect to the stream width (y-direction), $$\frac{\partial u}{\partial y}$$

or stream depth (z-direction), $$\frac{\partial u}{\partial z},$$

have the smallest absolute rate of change values near the belly 17 of the velocity profile 19A, 19B and their greatest absolute rate of change values at the boundaries 16 as shown in FIGS. 3A and 3B, respectively. Fish have a sensory system and behavior that cues into this natural pattern to find the optimum pathway. That is, outmigrating fish select the swim path through the river that minimizes the absolute value of the tensor variables in the flow field. In particular, in simple, straight channels 8 they minimize the absolute value of the rate of change $$\frac{\partial u}{\partial y} \text{ and } \frac{\partial u}{\partial z},$$

and thereby locate themselves over the deepest part of the channel 8 about equidistant from both shores 9 as much as the sensitivity of their sensory system allows. In addition to being the zone of maximum mean downstream water velocity, this zone is also where the changes in either the v 12 or w 13 components of velocity are also zero, i.e., mathematically, $$\frac{\partial v}{\partial y} = 0, \frac{\partial w}{\partial z} = 0.$$

Thus, the "side slip" from the v 12 component and the "up" or "down draft" from the z 13 component are minimized. Facilitating a fish swim path selection behavior that minimizes the absolute value of $$\frac{\partial u}{\partial y} \text{ and } \frac{\partial u}{\partial z}$$

allows fish to find and maintain position in this critical zone.

Refer to FIGS. 4 and 5. The design for the natural cue surface bypass collector (NC-SBC) 400 departs from the usual design criteria of imposing an attracting intake plume on the overall hydraulic pattern in the forebay of the dam 402. Instead, the new design, by its shape and position, slightly modifies the existing flow field 405 at the dam 402 immediately above the intakes 403 to create a flow minimizing the absolute value of the natural hydraulic cues, e.g., $$\frac{\partial u}{\partial y} \text{ and } \frac{\partial u}{\partial z},$$

at the slot entrance 501 of the collector gallery 409. This design feature causes outmigrating fish to swim to the slot entrance 501 instinctively in the same way they find the optimal swim path zone in the channels 8 of natural rivers and streams. Once juvenile fish have been attracted into the collector gallery 409, they are conveyed around the dam 402. Standard engineering practice is employed in designing the necessary outlet flows for the NC-SBC 400, following design criteria of minimizing the absolute value of the strain rate variables in the direction the fish are to be conveyed around the dam 402.

The main body of the OH-SBC 401 defines a channel. i.e., the collector gallery 409, and is made of structural iron or other appropriate material. The inner side of the OH-SBC 401 is made to be as smooth as possible to minimize the creation of turbulence and is coated with a neutral color, such as battleship gray, to avoid the possibility of providing visual cues to the fish. The upstream edge 414 of the OH-SBC 401 is wedge shaped and designed to completely fill the space above and upstream of the hydropower turbine intakes 403 that usually contain either a hydraulic eddy 101 or a hydraulic dead zone (not shown separately).

Refer to FIGS 1, 5, and 7. The upstream pointing extension 407 redirects the flow field so that the horizontal eddy 101 is completely enclosed within the collector gallery 409 not shown in FIG. 7 to enhance clarity. It also creates a zone of localized increase in strain along the flat plate (not shown separately) that redirects water into the turbine intake 403. By withdrawing a relatively small volume of water into the slot 501 a local minimum in strain is created that guides fish into the collector gallery 409. That is, the pattern in strain created by the OH-SBC 401 in conjunction with the existing pattern in strain created by flow into the turbine 403 intake creates a local minimum 413 in strain that guides fish into the slot 501 of the collector gallery 409. By enclosing the eddy 101 caused by the dam structure 402 and the turbine intakes 403 to within the collector gallery 409, a preferred embodiment of the present invention eliminates competing hydraulic cues from the vicinity of the slot 501 to the collector gallery 409. Initially, the extension 407 also compresses the vertical velocity profile (i.e., locally increases the absolute value of $$\left.\frac{\partial u}{\partial z}\right)$$

as the flow 405 dives towards the turbine intake 403. However, after the streamlines 405 are first trained downward, the slot 501 in the OH-SBC 401 allows the streamlines 405 to expand, i.e., the absolute value of $$\frac{\partial u}{\partial z}$$

decreases most gradually towards the slot 501 to the gallery 409. This simulates the "natural" hydraulic cue that fish use to locate the center of a channel 8. This hydraulic cue is further reinforced by the gradual withdrawal of water out of the collector gallery 409 to convey the fish around the dam 402. The NC-SBC 400 may be adjusted to meet changes in powerhouse operation and dam forebay water levels. An articulating extension 410 partially controls the angle of attack of the water that flows under the collector gallery 409. Adjustable attachment points 412 at the face of the dam 402 allow the OH-SBC 401 to be raised and lowered to optimize its efficiency as water levels fluctuate. In one embodiment, a hydrodynamic sensor 411 monitors water velocity and other hydraulic conditions to permit remote adjustment of the articulating extension 410 as well as to determine when the height of the OH-SBC 401 is optimized. In certain environments, such as spring runoff, trash accumulates over the top of the OH-SBC 401. If trash control is required, then a trashboom (not separately shown) can be installed upstream of the leading edge 414 of the wedge extension 407.

The relatively deep location of the bottom slot 501 of the collector gallery 409 minimizes the effect of daytime surface light on the efficiency of the OH-SBC 401 to attract fish into the bottom slot 501. Therefore, unlike conventional designs with surface oriented openings, a preferred embodiment of the present invention functions with nearly equal efficiency in all lighting conditions. The collector gallery 409 is relatively dark and characterized by a relatively low-energy hydraulic regime. Therefore, secondary stimuli, such as artificially-produced light or sound, may increase the efficiency of the of the NC-SBC 400.

While the present invention has been described in connection with the preferred embodiments of the various elements, it is to be understood that other similar embodiments may be used or modifications and additions may be made to the present described embodiment for performing the same function of the present invention without deviating therefrom. Therefore, the present invention should not be limited to any single embodiment, but rather construed in breadth and scope in accordance with the recitation of the appended claims.

We claim:

1. A hardware system, adjustable vertically as installed in a waterway upstream from at least one barrier to the downstream migration of fish in said waterway, said barrier having at least an upstream and a downstream side, said system installed and maintained to attract and collect fish in a collector gallery by passively simulating at least one natural hydraulic cue to which fish are responsive by adjusting said system to existing hydraulic conditions of said waterway, wherein said fish that are attracted by said system circumvent said at least one barrier, and wherein said system provides at least one natural hydraulic cue that elicits an instinctive response of said fish to select a portion of said waterway enclosed at least in part by said system and having a near maximum downstream velocity vector, u, and at least minimum strain rate variables in the downstream direction with respect to the depth and the width of said waterway, and wherein said variables are represented mathematically as $$\frac{\partial u}{\partial z} \text{ and } \frac{\partial u}{\partial y},$$

respectively, and wherein both said variables ideally approach zero, and wherein said system further comprises at least an oven hood surface bypass collector (OH-SBC), having length, width and depth, a top and a bottom, an interior surface and an exterior surface, a main portion with at least one slot opening at said bottom and at least one extension that projects upstream from said at least one barrier alone said width, and wherein said extension eliminates at least one zone of dead water that may be adjacent said upstream side of said barrier, and wherein said OH-SBC is positioned with said length adjacent and parallel to said upstream side of said at least one barrier, and wherein said top is generally parallel to the surface of said water in which said OH-SBC operates, and wherein said depth is selected to permit passage of fish of a pre-specified size, and wherein said OH-SBC further comprises:
  at least one internal sluiceway circumscribed at least in part by said extension, wherein said extension is wedge shaped with the point of the wedge positioned farthest away upstream from said main portion, and wherein said extension maintains the same profile on its top as said main portion, being an unbroken extension thereof, and wherein said at least one internal sluiceway runs parallel to said upstream side of said at least one barrier;
  at least one collector gallery that parallels said sluiceway immediately adjacent
  said upstream side of said at least one barrier and is circumscribed at least in part
  by said main portion of said OH-SBC, wherein said fish are attracted to said collector gallery by said simulated hydraulic cue maintained by said system, and wherein said fish are moved around said barrier by at least partially de-watering said collector gallery; and
  at least one articulating extension affixed to said lower part of said collector gallery, wherein said articulating extension at least partially controls the angle of attack of the water that flows under said collector gallery.

2. The system of claim 1 further comprising at least one sensor, wherein said at least one sensor alerts to changing hydraulic conditions, permitting adjustment of said system.

3. The system of claim 1 in which said at least one barrier is selected from the group consisting of a dam, a hydroelectric powerhouse, a weir, a boom, a berm, a sluice gate, and a spillway, and combinations thereof,
  wherein each member of said group has at least one intake on said upstream side, and
  wherein said system is movable vertically without changing the horizontal orientation of said system to facilitate operation at an optimum level with respect to said at least one intake, and
  wherein said system operates to overcome at least one natural cue resultant from the operation of said at least one intake.

4. The system of claim 1 in which at least one of said natural hydraulic cues is at least one visual cue.

5. The system of claim 4 further comprising a neutral color on the inside of said collector gallery.

6. The system of claim 1 in which turbulence in said collector gallery is minimized by providing a smooth surface on said interior surface of said OH-SBC and applying a coating to said smooth surface, wherein said coating has a low coefficient of friction.

7. The system of claim 1 in which said first extension completely covers the space above and immediately upstream of an intake of a dam, wherein said first extension further displaces any eddy otherwise occurring above said intakes and in the vicinity of said slot opening.

8. The system of claim 4 further comprising at least one active stimulus provided in the region of said collector gallery, said stimulus selected from the group consisting essentially of natural light, artificial light, sound, and combinations thereof.

9. A system simulating at least one natural hydraulic cue to which fish are responsive in water, said at least one natural hydraulic cue eliciting an instinctive response of fish to select a portion of a stream having a near maximum downstream velocity vector, u, and at least minimum strain rate variables in the downstream direction with respect to the depth and the width of the stream, said variables represented mathematically as $$\frac{\partial u}{\partial z} \text{ and } \frac{\partial u}{\partial y},$$

respectively, such that both said variables ideally approach zero, said system comprising at least an oven hood surface bypass collector (OH-SBC), having length, width and depth, a top and a bottom, an interior surface and an exterior surface, a main portion with at least one slot opening at said bottom and at least one extension that projects upstream from at least one barrier along said width, said barrier having at least an upstream and a downstream side, said OH-SBC further comprising:

at least one internal sluiceway circumscribed at least in part by said extension,
  said sluiceway running parallel to said upstream side of said at least one barrier,
  wherein said OH-SBC is positioned with said length adjacent and parallel to said upstream side of said at least one barrier, and
  wherein said top of said OH-SBC is generally parallel to the surface of said water in which said OH-SBC operates, and
  wherein said extension eliminates at least one zone of dead water that may be adjacent said upstream side of said barrier, and
  wherein said extension is wedge shaped with the point of the wedge positioned farthest away from said main portion, and
  wherein said extension maintains the same profile on its top as said main portion, being an unbroken extension thereof;
  at least one collector gallery that parallels said sluiceway and is circumscribed at least in part by said main portion of said OH-SBC,
  at least one articulating extension affixed to said lower part of said collector gallery,
  wherein said articulating extension at least partially controls the angle of attack of the water that flows under said collector gallery, and
  wherein said fish are attracted to said collector gallery by said simulated hydraulic cue maintained by said system, and
  wherein said fish that respond to said at least one simulated hydraulic cue circumvent at least one barrier to the downstream migration of said fish, and
  wherein said fish are moved around said barrier by at least partially de-watering said collector gallery; and
  wherein said depth is selected to permit passage of fish of a pre-specified size.

10. The system of claim 9 further comprising at least one sensor, wherein said at least one sensor alerts to changing hydraulic conditions, permitting adjustment of said system.

11. The system of claim 9 in which at least one of said natural hydraulic cues is at least one visual cue.

12. The system of claim 11 further comprising a neutral color on the inside of said collector gallery.

13. The system of claim 9 in which turbulence in said collector gallery is minimized by providing a smooth surface on said interior surface of said OH-SBC and applying a coating to said smooth surface, said coating having a low coefficient of friction.

14. The system of claim 9 in which at least one additional stimulus is provided in the region of said collector gallery, said stimulus selected from the group consisting essentially of natural light, artificial light, sound, and combinations thereof.

* * * * *